United States Patent
Kröber et al.

(10) Patent No.: US 9,476,532 B2
(45) Date of Patent: Oct. 25, 2016

(54) PROTECTIVE DEVICE FOR A PRESSURE LINE, PRESSURE LINE SECTION AND HYDRAULIC SYSTEM

(71) Applicant: Airbus Operations GmbH, Hamburg (DE)

(72) Inventors: Peter Kröber, Deinste (DE); Ralf Pohlmann, Harsefeld (DE); Ingo Scheel, Buxtehude (DE)

(73) Assignee: Airbus Operations GmbH, Hamburg (DE)

( * ) Notice: Subject to any disclaimer, the term of this patent is extended or adjusted under 35 U.S.C. 154(b) by 247 days.

(21) Appl. No.: 13/648,100

(22) Filed: Oct. 9, 2012

(65) Prior Publication Data

US 2013/0074952 A1 Mar. 28, 2013
US 2016/0281898 A9 Sep. 29, 2016

Related U.S. Application Data

(63) Continuation of application No. PCT/EP2011/001795, filed on Apr. 11, 2011.

(60) Provisional application No. 61/322,467, filed on Apr. 9, 2010.

(30) Foreign Application Priority Data

Apr. 9, 2010 (DE) ........................ 10 2010 014340.5

(51) Int. Cl.
| F16L 57/00 | (2006.01) |
| F16L 55/00 | (2006.01) |
| F16L 35/00 | (2006.01) |

(52) U.S. Cl.
CPC ............ *F16L 55/00* (2013.01); *F16L 35/00* (2013.01); *F16L 57/00* (2013.01); *Y10T 137/7043* (2015.04)

(58) Field of Classification Search
CPC ....... F16L 13/148; F16L 59/12; F16L 59/13; F16L 57/00
USPC .................... 138/104, 109–111, 112–114, 99
See application file for complete search history.

(56) References Cited

U.S. PATENT DOCUMENTS

| 1,982,995 A | * | 12/1934 | Lane | ....................... E01F 5/005 138/106 |
| 3,782,452 A | * | 1/1974 | Ceplon | ........................ 165/135 |

(Continued)

FOREIGN PATENT DOCUMENTS

| CN | 101172521 | 5/2008 |
| DE | 33 30 837 | 4/1984 |

(Continued)

OTHER PUBLICATIONS

Chinese Office Action for Application No. 201180028426.2 dated Mar. 28, 2014.

(Continued)

*Primary Examiner* — Paul R Durand
*Assistant Examiner* — Charles P Cheyney
(74) *Attorney, Agent, or Firm* — Jenkins, Wilson, Taylor & Hunt, P.A.

(57) ABSTRACT

The invention pertains to a protective device for a pressure line for conveying pressurized fluids, as well as to a pressure line section with a pressure line for conveying pressurized fluids and a corresponding protective device.

11 Claims, 7 Drawing Sheets

(56) References Cited

U.S. PATENT DOCUMENTS

| | | | | |
|---|---|---|---|---|
| 3,916,955 | A | * | 11/1975 | Netterstedt et al. .......... 138/155 |
| 4,396,656 | A | * | 8/1983 | Still ........................ B29C 61/10 |
| | | | | 174/92 |
| 4,615,359 | A | | 10/1986 | Affa et al. |
| 4,834,825 | A | * | 5/1989 | Adams et al. ................ 156/294 |
| 5,303,744 | A | * | 4/1994 | Eriksson .................... 138/110 |
| 5,402,830 | A | * | 4/1995 | Dortzbach ................ F16L 9/18 |
| | | | | 138/110 |
| 6,039,066 | A | * | 3/2000 | Selby ............................ 137/312 |
| 6,202,656 | B1 | * | 3/2001 | Schmitt ............. H01L 21/67109 |
| | | | | 134/105 |
| 7,484,534 | B2 | * | 2/2009 | Schmidt ........................ 138/106 |
| 7,591,286 | B2 | * | 9/2009 | Howard ................ H02G 9/065 |
| | | | | 138/108 |
| 8,875,744 | B2 | * | 11/2014 | Taagepera ............... F16L 59/06 |
| | | | | 138/110 |
| 2001/0050110 | A1 | * | 12/2001 | Born et al. .................... 138/111 |
| 2003/0168248 | A1 | * | 9/2003 | Savoy et al. .................. 174/136 |
| 2007/0181204 | A1 | * | 8/2007 | Stout ............................ 138/149 |
| 2009/0223584 | A1 | | 9/2009 | Gray |

FOREIGN PATENT DOCUMENTS

| | | |
|---|---|---|
| DE | 37 12 955 | 11/1988 |
| DE | 100 44 536 | 4/2002 |
| DE | 203 10 292 | 9/2003 |
| DE | 10 2005 028 766 | 1/2007 |
| DE | 10 2009 003 938 | 7/2010 |
| DE | 10 2009 014 985 | 11/2010 |
| DE | 10 2010 014 340 | 2/2012 |
| JP | 10073198 | 3/1998 |
| WO | WO 2010/003174 | 1/2010 |
| WO | WO 2011/124398 | 10/2011 |

OTHER PUBLICATIONS

Chinese Office Action for Application No. 201180028426.2 dated Feb. 2, 2015.

* cited by examiner

PROTECTIVE DEVICE FOR A PRESSURE LINE, PRESSURE LINE SECTION AND HYDRAULIC SYSTEM

CROSS-REFERENCE TO RELATED APPLICATIONS

This application is the continuation of and claims priority to PCT Patent Application PCT/EP2011/001795 filed Apr. 11, 2011 which claims priority to German Patent Application No. DE 10 2010 014 340.5 filed on Apr. 9, 2010 and to U.S. Provisional Patent Application No. U.S. 61/322,467 filed on Apr. 9, 2010, the disclosures of which are incorporated herein by reference.

TECHNICAL FIELD

The invention pertains to a protective device for a pressure line for conveying pressurized fluids, as well as to a pressure line section with a pressure line for conveying pressurized fluids, a corresponding protective device and a hydraulic system.

BACKGROUND

Pressure lines of the type typically used for conveying pressurized fluids in hydraulic systems or other systems are known in the form of tubes or hoses, through which the pressurized fluids are conveyed. For example, known hydraulic systems are equipped with pressure lines, in which a hydraulic fluid such as, for example, hydraulic oil is conveyed under pressure. Due to the isobaric properties of the hydraulic oil, this makes it possible to also transmit forces over long distances in a largely lossless fashion. This basic concept of a hydraulic device is based on pressure lines that are largely stable under pressure and thusly maintain the power losses during the conveyance of pressurized fluids as low as possible.

In known systems, particularly hydraulic systems with pressure lines, it is disadvantageous that a leak in the pressure lines can from a technical viewpoint never be completely ruled out. Although the risk of a leak can be reduced in dependence on the chosen material and the geometry of the pressure lines, a leak basically can never be ruled out. In the utilization of hydraulic systems in safety-relevant areas, the damage scenario, i.e., a leak in a pressure line, therefore basically needs to be considered as worst conceivable accident. In the utilization of hydraulic systems in aircraft, for example, this is the reason why redundant systems are usually provided, wherein certain systems are even realized in the form of triple-redundant systems. In case a pressure line of the hydraulic system develops a leak, the redundantly designed second pressure line system therefore can take over the conveyance of the pressurized fluids. The redundancy therefore ensures the functionality of the conveyance of the pressurized fluids. In known systems, however, it is disadvantageous that the pressurized fluid to be conveyed can and does escape due to a leak in the pressure line system.

SUMMARY

It is the objective of the present invention to eliminate the above-described disadvantages.

The aforementioned objective is attained, as well as with pressure line sections as disclosed herein. Another object of the present invention is a hydraulic system for an aircraft.

In this respect, one essentially distinguishes between two damage scenarios that may occur in combination. In the first scenario, the fluid escapes from the pressure line through the leak such as, for example, a crack under the influence of the pressure within the pressure line. Particularly when using high pressures such as, for example, in hydraulic systems for aircraft, in which these pressures usually amount to 3000 psi or approximately 200 bar and can sometimes reach 5000 psi or approximately 300 bar, the escaping fluid therefore is charged with a large amount of kinetic energy and exits the pressure line through the leak with a very high speed. The high speed of the fluid jet, for example a hydraulic oil jet, can lead to the plastic deformation or even the perforation of surrounding materials. When using the hydraulic systems in areas that are accessible to humans, the respective persons furthermore are subject to a high risk of injuries. Hydraulic systems that are arranged, for example, in high-lift systems of aircraft consequently endanger service personnel located in the vicinity of the high-lift systems in case of a leak. This first damage scenario therefore can be summarized as a "mechanical damage scenario" in the form of injuries to surrounding materials or persons.

The second damage scenario that may occur in combination with the first damage scenario can be referred to as "contamination damage scenario." This means that the escaping pressurized fluid not only represents a mechanical hazard due to its high kinetic energy, but also contaminates the surroundings of the pressure line due to the type of discharge, for example, when the fluid is sprayed in the form of a mist. This may once again concern a purely technical contamination, i.e., a coating of the surrounding components with a fluid layer that can lead to the malfunction or even the failure of said components, for example, electronic components arranged in the area of the pressure line. However, the personnel may also be affected. In hydraulic systems, it is common practice to use hydraulic oils that are unhealthy or even highly toxic to humans. In such an instance, the escape of hydraulic fluid and, in particular, the spraying of the hydraulic fluid in the form of a mist would endanger the life of persons located in this area.

According to a first variation of the present invention, an inventive protective device for a pressure line for conveying pressurized fluids that extends in the longitudinal direction, the radial direction and the circumferential direction referred to the radial direction features spacers and energy absorption means that are locally fixed by the spacers. The directional indications longitudinal direction, radial direction and circumferential direction used in this description refer to the above-described directions, in which the pressure line extends. The protective device is intended for a pressure line, but does not contain this pressure line. The spacers fix the energy absorption means with respect to their absolute location. Consequently, they also define, in particular, the position of the energy absorption means with respect to their location relative to a pressure line situated in the vicinity. The energy absorption means of this first variation of the present invention feature at least two shell parts that extend in the longitudinal direction and are curved in the radial direction. These shell parts surround an inner region that is protected by the protective device and in which at least one pressure line is arranged, namely such that the edge regions of the shell parts circumferentially overlap along the longitudinal direction. In case of a leak in the at least one pressure line, a direct fluid jet originating from pressure lines situated in the inner region can be intercepted by at least one of the shell parts.

In this context, the term shell part refers to the geometric shape of, for example, sheet metals or thin material layers with an essentially C-shaped cross section. In this case, the C-shaped cross section is realized due to the curvature of the respective shell part. The curvature does not necessarily have to be constant over the entire cross section, but rather may have different curvature radii in the circumferential direction, as well as in the longitudinal direction, at different locations of the shell parts. In the context of the present invention, the term "curved" shell parts may also refer to an unsteady curvature, i.e., individual regions of the curved shell parts may also have an infinitely large curvature radius and therefore form of a straight region. The edge regions of the shell parts in the circumferential direction, in which the inventive overlap is realized, consequently are the regions, in which the respective shell part ends in the circumferential direction. If one follows a fluid jet escaping from a leaking pressure line accommodated in the protective inner region radially outward, it becomes clear that the inventive arrangement of the at least two curved shell parts, particularly their overlap, results in the fluid jet being necessarily intercepted by at least one of the shell parts. This is ensured due to the fact that the edge regions overlap in the circumferential direction of the shell parts. With respect to the geometric design, there is no direct path out of the protected inner region of the protective device along a straight line due to this overlap. However, since pressurized fluids escape from a leakage opening of a pressure line arranged in this protected inner region with high kinetic energy, a dispersion area is created directly adjacent to the leakage opening, wherein this dispersion area is essentially defined by a bundle of straight lines. This bundle of straight lines has a shape that depends on the type and the shape of the leakage opening and, for example, with essentially round leakage openings usually results in an envelope for the dispersion area of the fluid jet that respectively has the shape of a cone or truncated cone. The dispersion angle such as, for example, the aperture angle of a truncated cone not only depends on the leakage opening in this case, but also on the pressurized fluid contained in the pressure line. However, since the fluid jet propagates within the straight bundle due to its high kinetic energy and none of these straight lines directly extends out of the protected inner region of the protective device due to the inventive arrangement of the shell parts, the overlap prevents a fluid jet with high kinetic energy from exiting the protected inner region.

On the contrary, each fluid jet impacts on one of the curved shell parts at least once and loses a certain portion of its kinetic energy during the impact. The loss of kinetic energy takes place, for example, due to elastic and/or plastic deformations of the curved shell parts. In this respect, it would also be possible that a plurality of fluid jets impacts on a plurality of impact points on different shell parts.

However, the inventive overlap of the shell parts is by no means realized tight, wherein an overlap is provided in the circumferential direction, but not in the radial direction. This means that the individual shell parts are spaced apart from one another in the radial direction, particularly that a radial clearance predominates in the edge regions of the overlap of the shell parts. This radial clearance can also be referred to as an opening of the energy absorption means and, in the context of the present invention, usually extends along the longitudinal direction of the protective device. However, a plurality of openings that are sealed relative to one another could also radially extend between the shell parts along the longitudinal direction. Due to the overlapping arrangement of the individual shell parts, however, these openings are automatically arranged such that no direct jet originating from a leakage opening in the pressure line can escape from the protected inner region. In fact, the fluid can only escape from the protected inner region through these openings in the overlapping regions after it has been decelerated, i.e., after the kinetic energy of the fluid jet has been reduced. Consequently, an inventive protective device is suitable for protecting against the mechanical damage scenario described in the introduction to this description.

In an inventive protective device according to the first variation, as well as other variations with shell parts as energy absorption means, it may furthermore be advantageous to secure the shell parts from moving relative to one another in the circumferential direction. It is advantageous to prevent such a relative movement in the circumferential direction because an undesirable change of the overlap, particularly a cancellation of the inventive overlap, can otherwise [not] be prevented. The shell parts could otherwise shift relative to one another in the circumferential direction and therefore open up overlapping regions that previously prevented a direct fluid jet from escaping from the protected inner region. A safety for preventing movements relative to one another therefore improves the reliability of an inventive protective device with respect to the deceleration of pressurized fluid jets escaping from the pressure line in case of a leak.

In the inventive protective device according to the first variation, as well as other variations with shell parts as energy absorption means, it may also be advantageous if the radial clearance between the shell parts at the overlaps is greater than or equal to the thickness of one of the two shell parts in the radial direction. This defines a minimum clearance that consequently results in the minimum size of the opening between the individual shell regions. In this case, it is furthermore advantageous if the radial clearance between the individual shell parts is so large that the resulting total opening cross section makes it possible to discharge at least the fluid flow conveyed in the pressure line in case the pressure line develops a leak. The openings in the individual shell parts, i.e., the radial clearances between the individual shell parts in the overlapping regions, are advantageously chosen such that a greater volume of fluid than that conveyed within the pressure line can be discharged. When compressible fluids are conveyed in the pressure line such as, for example, in the conveyance of gases, it also needs to be taken into account that an expansion takes place in case of a leak and the volume to be discharged is greater depending on the pressure loss that occurs when the fluid exits the leakage opening. Such an embodiment has the advantage that a subsequent damage scenario, i.e., the buildup of pressure in the protective device in case of a leak in the pressure line and therefore a secondary damage scenario in the form of a leak of the protective device, can be prevented. In other words, a defined radial clearance between the individual shell parts in their edge regions in order to ensure the overlap and the thusly created openings makes it possible to discharge the fluid exiting the leakage opening in the pressure line in a defined fashion.

Another object of the present invention is a pressure line section according to a first variation for a pressure line for conveying pressurized fluids, wherein said pressure line section features a pressure line for conveying pressurized fluids that extends in the longitudinal direction, the radial direction and the circumferential direction referred to the radial direction. In contrast to the protective device, the inventive pressure line section therefore contains the pressure line itself. In addition, a protective device according to the first variation with spacers and energy absorption means locally fixed by the spacers is provided. These energy absorption means feature at least two shell parts that extend in the longitudinal direction and are curved in the radial direction, wherein said shell parts surround an inner region that is protected by the protective device and in which the pressure line is arranged, namely such that the edge regions of the shell parts circumferentially overlap along the longitudinal direction. Consequently, the protective device according to the first variation also serves for intercepting a direct fluid jet originating from the pressure line arranged in the inner region by at least one of the shell parts in case of a leak in the at least one pressure line. In other words, the inventive pressure line section features a protective device of the type that was already described in detail above in the form of a first variation and is placed around a pressure line in order to protect this pressure line. In comparison with known devices, an inventive pressure line section makes it possible to attain the same advantages as those already described in detail above with reference to the first variation of the protective device.

In this case, the protective device of an inventive pressure line section is realized, in particular, as already described in detail above with reference to the first variation of the protective device.

Another object of the present invention is a second variation of a protective device for a pressure line for conveying pressurized fluids that extends in the longitudinal direction, the radial direction and the circumferential direction referred to the radial direction. In this second variation of the protective device, energy absorption means are provided and circumferentially surround an inner region that is protected by the protective device and in which a pressure line is arranged along the longitudinal direction, namely such that, in case the pressure line develops a leak, the kinetic energy of the escaping fluid is reduced due to the impact of the fluid on the energy absorption means. In this second variation of the protective device, it is therefore not absolutely necessary to provide a shell part or several shell parts, but it would in fact be possible to realize other embodiments such as, for example, energy absorption means that essentially extend completely around the inner region. Due the inventive arrangement, in which the energy absorption means surround the protected inner region in the circumferential direction and in the longitudinal direction, it is also ensured that, analogous to the first variation of the protective device, no straight line and therefore also no straight jet of pressurized fluid originating from a possible leakage opening in a pressure line arranged in the inner region can exit this protected inner region in this embodiment of the protective device according to the second variation. In this case, the kinetic energy of a fluid jet that has exited the leakage opening in a pressure line is always reduced due to the impact on the energy absorption means.

In other words, the energy absorption means serve for decelerating or breaking up a fluid jet that has exited a leakage opening. As already explained above with reference to the first variation of the protective device, elastic and/or plastic deformations of the energy absorption means are also used in this case in order to reduce the kinetic energy of the fluid jet. This takes place at least once, but may also take place several times in order to additionally reduce the kinetic energy of the fluid jet due to multiple impacts thereof. Consequently, the second variation of the protective device according to the present invention serves for protecting against the mechanical damage scenario.

The second variation of the inventive protective device is furthermore provided with an outer casing that at least partially surrounds the energy absorption means and is realized in a porous and/or screen-like fashion such that it is permeable to the fluid in the pressure line. Due to the arrangement of the outer casing in correlation to the energy absorption means, this alternative of the inventive protective device according to the second variation protects against both damage scenarios described in the introduction to this description. In addition to protecting against the mechanical damage scenario with its energy absorption means, this arrangement also protects against the contamination damage scenario because the outer casing prevents the formation of mist outside the protective device. However, the fluid jet may divide and form a mist in the form of fine droplets in the interior of the protective device, for example, when the fluid jet impacts on the energy absorption means. This mist can also exit the protected inner region through the energy absorption means, but is intercepted by the outer casing. Due to its porous and/or screen-like design, the outer casing practically collects the mist, i.e., the finely dispersed droplets of the escaped fluid, and becomes saturated in a first step. However, this saturation does not complete the process, but the fluid that has escaped from a leak is in fact transported out of the protective device. If the outer casing has a porous design, this can be realized, for example, with the aid of capillary effects. However, the outer casing may also have a screen-like design and essentially feature small openings that exclusively serve for intercepting potential mist in the interior of the protective device and for transporting this mist outward in a controlled fashion. In other words, such an outer casing could also be referred to as a mist collector.

As already described in detail above with reference to the first variation of the protective device, it is also advantageous in this case if neither the energy absorption means nor the outer casing render the second variation of the protective device fluid-tight. The energy absorption means and the outer casing are both realized, in particular, such that they allow fluid conveyed in the pressure line to pass through at a rate that is at least as high as the flow rate of the fluid within the pressure line. Consequently, it is ensured that the entire fluid discharged from a leakage opening can exit the protective device although this exit takes place in a controlled fashion and therefore without the described damage scenarios. If the fluid would not have an option to exit the protective device, it would be possible that pressure once again builds up within the protective device over a certain period of time and a leak in the protective device, for example, in the energy absorption means and/or in the outer casing, causes the same damage scenarios as those initially described with reference to the pressure line.

In the second variation of the inventive protective device, the energy absorption means are entirely arranged between inner region and the outer casing such that fluid escaping from a leak in the pressure line must first impact on the energy absorption means, wherein the energy absorption means are provided with at least one opening that is realized such that the fluid can come in contact with the outer casing with reduced kinetic energy and exit the protective device through the outer casing. This correlation results in the above-described advantages. It is furthermore ensured that the two elements energy absorption means and outer casing can function separately of one another. This makes it possible, in particular, to realize embodiments, in which the respective element is specifically designed for the respective damage scenario. For example, the energy absorption means may be explicitly designed for preventing the mechanical damage scenario and the outer casing may be explicitly designed for preventing the contamination damage scenario. When using porous materials such as sintered metallic materials for the outer casing, for example, a mechanical stability of the outer casing is no longer required. In this case, the absorption of mechanical forces in the mechanical damage scenario is exclusively realized with the energy absorption means.

The second variation of the inventive protective device therefore aims to provide combined protection against both damage scenarios, wherein the energy absorption means may be designed more freely than in the first variation. The embodiments of the second variation described below naturally may also be used in combination with the first variation of the protective device.

Within the scope of the present invention, not only a single pressure line, but at least two pressure lines naturally may be arranged within the protective device, namely in both variations of the inventive protective device, as well as in all pressure line sections. If the inventive protective device is used, in particular, for hydraulic systems with a redundant design such as, for example, in the construction of aircraft, redundancy systems such as, for example, four hydraulic systems can be protected with a single protective device in a cost-efficient, as well as material-saving and therefore weight-saving fashion, wherein the latter two aspects are particularly important in the construction of aircraft. This may be advantageous, in particular, if a leak and an escaping fluid jet with high kinetic energy could possibly damage redundant pressure lines and cause secondary leaks.

In the second variation of the inventive protective device, it may be advantageous if the energy absorption means consist of several shell parts similar to the first variation and the individual shell parts of the energy absorption means surround the protected inner region, in which a pressure line can be arranged, such that the individual shell parts of the energy absorption means circumferentially overlap one another along the longitudinal direction. This overlap provides the same advantages as those already described in detail above with reference to the first variation of the protective device. The described first variations naturally may also be combined with the second variation of the protective device in this case.

With respect to the overlap of the shell parts, it may be advantageous if the individual shell parts of the energy absorption means are realized such that their total peripheral angle in the circumferential direction is greater than or equal to 360°. A design with peripheral angles greater than 360° in the circumferential direction, in particular, provides a sufficient overlap such that a larger cover area can be achieved.

In a protective device according to the second or the first variation that is designed with at least two shell parts, it may be advantageous if the energy absorption means feature at least one inner shell part and at least one outer shell part. In this case, the inner and outer shell parts are arranged in such a way that the dispersion area for fluid escaping from the pressure line that is defined by the dimensions of the opening of the energy absorption means and all possible leakage points of a pressure line to be arranged in the protected inner region, i.e., the three-dimensional dispersion volume, is covered by the outer shell part. This geometric arrangement practically defines the minimum overlap between the edge regions of the outer shell part and the inner shell part. In other words, this also makes it possible to determine the angle, by which the sum of the peripheral angles needs to exceed 360°.

The dispersion area, i.e., the three-dimensional dispersion volume, is formed by drawing a tangent or a plurality of tangents on an essentially round pressure line that may be arranged in the interior of the protective device and through the end of the edge region of the opening. This makes it possible to define the maximum dispersion area, i.e., the maximum dispersion volume, and therefore also the region to be covered.

In an inventive protective device according to not only the second variation, but also the first variation, it may be advantageous if the individual shell parts of the energy absorption means are shaped in such a way that they can at least partially accommodate all components that lie farther radially inward. With respect to the design of the shell parts, particularly the curvatures of the shell parts and the arrangement of the edge regions are chosen such that the shell parts open in a way suitable for accommodating the inwardly positioned components. Such a geometric design makes it possible, in particular, to retrofit the inventive protective device on existing or installed pressure lines. In the embodiment that consists of an inner and an outer shell part, the inner shell part can be placed around the pressure line and mounted in a first step and the inner region can be protected in a second step by placing the outer shell part around the inner shell part, particularly in such a way that the shell parts circumferentially overlap in accordance with the invention and the energy absorption means are realized.

When using an outer casing for an inventive protective device, it is advantageous if this outer casing also has a C-shaped cross section similar to the shell parts such that the openings of the C-shaped cross section can accommodate all inwardly positioned components, i.e., the provided pressure lines as well as the energy absorption means in this case. Consequently, it is possible to retrofit a protective device according to the second variation and the first variation of the present invention.

According to the second variation of the inventive protective device, the energy absorption means may also be realized in one piece, wherein the at least one opening is formed by cutting along a line and subsequently exposing the material of the energy absorption means. The cutting along a line and the exposing make it possible to construct an energy absorption means as it is known, for example, from kitchen graters. In this way, no straight lines can extend out of the protected inner region within the energy absorption means. Consequently, such an energy absorption means makes it possible to realize the fundamental idea of the invention without a shell-shaped design.

In all variations, the utilization of the inventive protective devices and pressure line sections provides the significant advantage that the pressure lines are protected with respect to their mechanical damage scenarios and their contamination damage scenarios. However, all variations of the protective devices according to the present invention completely enclose the pressure lines such that it is no longer possible to inspect the pressure lines within the protective device without removing the protective device. Since the removal of the protective device not only involves the removal effort, but also may unfavorably affect the protective effect of the protective device, it may be advantageous to provide the outer casing with an indicator material that reacts with an indication when it comes in contact with the fluid contained in the pressure line. This indication may consist, for example, of a color change as it occurs in the utilization of litmus. In case of a leak or even the initial stages of a leak, in which the fluid escapes drop-by-drop, said fluid sooner or later reaches the outer casing through the energy absorption means such that it can react with the indicator material and produce an indication. When using the color change principle, the leak can be externally detected due to the discolored indicator material while maintenance procedures are carried out and the corresponding protective device at the location of the leak can be removed. However, it is no longer necessary to completely remove the protective device. Alternatively, it would also be possible to use indicator materials that can be electrically contacted and, for example, change their conductance or resistance such that it is not only possible to realize an optical control, but also an automated control, for example an electric control, of the outer casing.

In all variations of an inventive protective device, it is basically advantageous to realize the energy absorption means, as well as the outer casing, in such a way that it is possible to retrofit already existing pressure lines. As already described above, this can be achieved, for example, with a C-shaped design of the energy absorption means and the outer casing and the option of accommodating all inner components. However, it is also possible to use multipart energy absorption means and/or a multipart outer casing, the individual parts of which are connected to one another by means of flanges. The retrofitting option provides the advantage that existing pressure lines do not have to be removed for the retrofitting process. In this way, the retrofitting can be carried out in a cost-efficient and, in particular, time-saving fashion. Especially the advantage of time savings is particularly decisive in the utilization of all variations of the inventive protective devices in aircraft because maintenance times represent downtimes of the aircraft and therefore operational downtimes.

Another object of the present invention is a second variation of a pressure line section for pressurized fluids with a pressure line for conveying pressurized fluids that extends in the longitudinal direction, the radial direction and a circumferential direction referred to the radial direction. In this case, a second variation of the protective device according to the detailed preceding description is furthermore provided. A pressure line section with a protective device according to the second variation provides the same advantages as those already explicitly described above, particularly the combined protection against both damage scenarios, i.e., the mechanical damage scenario and the contamination damage scenario. In this case, the protective device may feature all design options that were already described above with reference to the protective devices.

Another object of the present invention is a hydraulic system for an aircraft with a plurality of hydraulic lines, wherein the hydraulic lines of said hydraulic system are at least partially realized in the form of a pressure line section according to the two inventive pressure line sections described herein. In this way, a hydraulic system of an aircraft can benefit from the described shaped parts and additional developments of the inventive pressure line sections. In the regions of the pressure line sections according to the present invention, the hydraulic system consequently is protected, in particular, against the mechanical damage scenario and the contamination damage scenario described in the introduction to this description.

BRIEF DESCRIPTION OF THE DRAWINGS

The present invention is described in greater detail below with reference to the attached drawings. In this context, the terms "left," "right," "top" and "bottom" refer to the orientation of the drawings with normally legible reference symbols. In the drawings.

DETAILED DESCRIPTION

Figure 1:
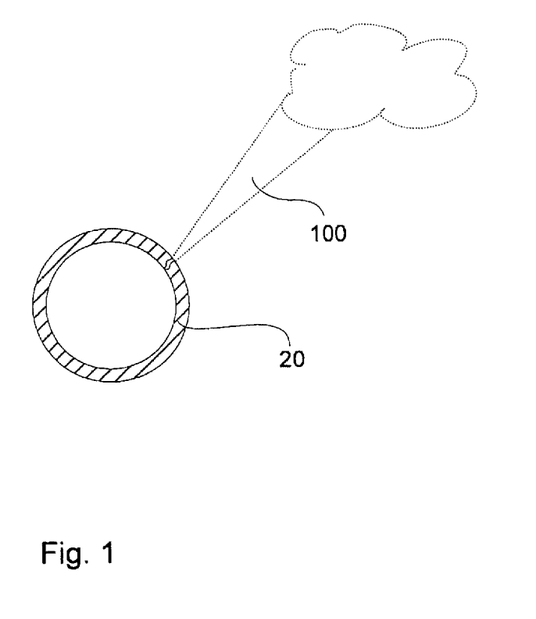
FIG. 1 shows a leak in a pressure line without protective device.

FIG. 1 shows the normal instance of a leak in a pressure line 20, i.e., without a protective device. In this case, a crack has developed in the pressure line on the upper right side and a fluid jet 100 is discharged through this crack. The fluid jet 100 disperses as its distance from the pressure line 20 increases, wherein the type and speed of this dispersion depend on the shape of the leak and on the fluid being discharged. Round leakage holes cause the fluid jet 100 to expand in an essentially cone-shaped fashion. The cross section illustrated in FIG. 1 consequently also shows the expanding fluid jet 100 in the form of a cross section. In this case, the cross section respectively expands in the shape of a cone or a truncated cone.

As graphically indicated in FIG. 1, a leak in the pressure line 20 essentially results in two damage scenarios. Firstly, the fluid exits the pressure line 20 in the form of a fluid jet 100 that is ejected with high kinetic energy due to the internal pressure in the pressure line 20. In other words, the fluid jet 100 moves very fast when it exits the pressure line 20. The speed of the fluid jet 100, i.e., its kinetic energy, can result in injuries to materials and persons located in the vicinity of the leak. This damage scenario is referred to as "mechanical damage scenario." Secondly, the leak and the fluid jet 100 being discharged create a fluid mist as the dispersion or expansion of the fluid jet 100 increases, wherein this mist contaminates the surroundings of the leak in the pressure line 20. When using fluids that may be toxic such as hydraulic fluids, this contamination not only affects or is detrimental to the health or life of persons located in the contaminated area, but also affects or damages electronic components in this area. For example, if ventilated electronic components are located in the vicinity of the leak, the hydraulic mist may be drawn into the fan and damage or even destroy the electronic components due to a short-circuit. If pressurized gases such as, for example, hot steam are conveyed in the pressure line 20, the contamination would pose a risk of injuries to persons in the surroundings. In the context of the present application, this damage scenario is referred to as contamination damage.

The two damage scenarios may also occur in combination, for example, in hydraulic systems with escaping hydraulic fluids or, for example, in steam system with escaping hot steam. However, the respective damage needs to be evaluated differently depending on the application. For example, escaping hot steam has a much lower contamination damage effect than highly toxic hydraulic fluids. In this respect, it is therefore much more important to focus on protecting against the mechanical damage scenario when conveying hot steam than when conveying hydraulic fluids.

Figure 2:
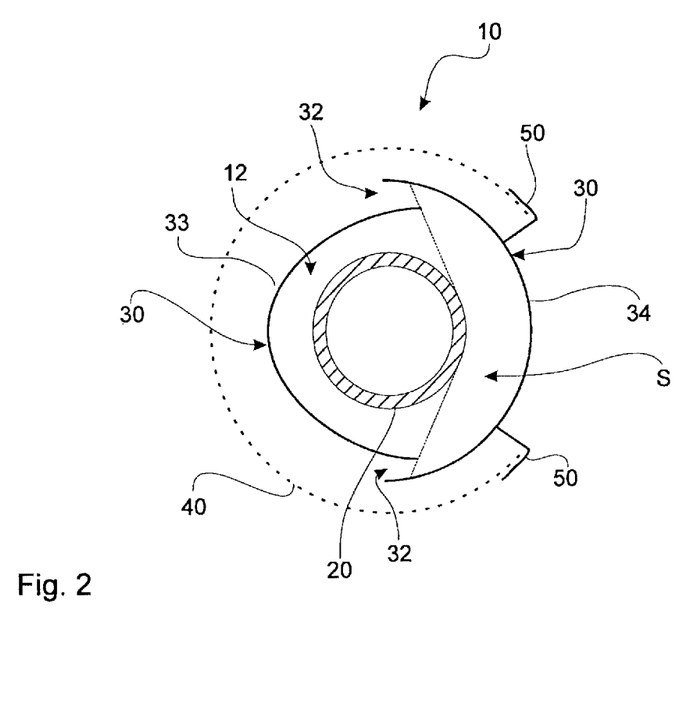
FIG. 2 shows a pressure line with a first embodiment of a protective device.

FIG. 2 shows a first embodiment of a pressure line section 10 that is secured with a protective device. In this case, a first variation of the protective is used that features two curved shell parts and was described above in the initial portion of the description. In FIG. 2, this secured pressure line section 10 is illustrated in the form of a cross section. From the inside toward the outside, this figure shows a pressure line 20 that is realized in the form of round tubing in this case. This round tubing 20 is surrounded by energy absorption means 30 in order to reduce the kinetic energy of fluid jets 100 being discharged from the pressure line 20.

The energy absorption means 30 of the embodiment according to FIG. 2 are realized in the form of shell parts 33 and 34. The two shell parts are respectively curved in the radial direction and extend along the longitudinal direction. In the context of the present application, the directional indications "radial direction," "longitudinal direction" and "circumferential direction" always refer to the pressure line 20.

In the present instance, the shell parts 33 and 34 circumferentially overlap along the longitudinal direction such that the dispersion area S, i.e. the maximum area, in which the fluid jet 10 can be discharged from a potential leak in the pressure line 20 in order to impact on the outer shell part 34, is completely covered. In this case, a tangent was drawn on the round cross section of the pressure line 20 and through the end of the edge region of the inner shell part 33 such that the dispersion area S is positively defined with respect to its impact on the outer shell part 34 and covered by the outer shell part 34. The extreme case of a leakage opening in the protected inner region 12 was defined in this fashion. Accordingly, all other locations of potential leakage openings are also covered by one of the two shell parts 33 or 34. Consequently, the energy absorption means 30 in the form of the two shell parts 33 and 34 protect against all potential leaks in the pressure line 20.

The two shell parts 33 and 34 overlap in the circumferential direction, but are spaced apart from one another in the radial direction. This results in openings 32 being created between the two shell parts 33 and 34 in the edge regions thereof, i.e., in the region of the overlap, wherein the fluid conveyed in the pressure line 20 can exit the inner region 12 within the energy absorption means 30 through these openings. However, the shell parts 33 and 34 of the energy absorption means 30 are arranged in such a way that a fluid jet 100 being discharged, particularly the dispersion area S, always initially impacts on one of the two shell parts 33 or 34 along a straight line. Consequently, the shell parts 33 or 34 decelerate the fluid jet 100 due to its impact on the energy absorption means in any case, i.e., with any shape or at any location of a leak in the pressure line 20. Subsequently, the fluid jet or the decelerated fluid can exit the inner region 12 within the energy absorption means 30 through the openings 32. In this case, the openings 32 also extend along the longitudinal direction of the pressure line such that the illustration in FIG. 2 represents an exemplary cross section that with respect to its basic functionality essentially exists at any location of the pressure line section 10.

Due to the fact that a fluid jet 100 being discharged from a potential leak in the pressure line 20 always initially impacts on the energy absorption means 30, i.e., one of the shell parts 33 or 34, the kinetic energy of the fluid jet 100 is reduced. Only fluid with thusly reduced energy, i.e., decelerated fluid, can exit the inner region 12 of the openings 32 and continue on its path in the direction of the outer casing 40. Consequently, the energy absorption means serve for preventing the mechanical damage scenario.

Once the kinetic energy of the fluid has been reduced, a mist of the conveyed fluid may still exist in the inner region 12, as well as in other regions around the pressure line 20. With respect to the damage scenario, it is irrelevant whether the mist is already created during the discharge from the leakage opening or at a later time, for example, when the fluid jets 100 impacts on the energy absorption means 30. This mist poses the risk of contaminating the surroundings of the pressure line as explicitly described above with reference to the contamination damage scenario. In order to prevent this contamination, an outer casing 40 is furthermore provided in the exemplary embodiment according to FIG. 2, wherein this outer casing is made of a sintered metallic material in this embodiment. Alternatively to the sintered metallic material, it would also possible to realize the outer casing of felt or metallic felt or in the form of a screen. The mechanical stability of the outer casing 40 is of secondary importance because it essentially needs to only support its own weight. The majority of the kinetic energy of the fluid being discharged from a leak in the pressure line 20 is already absorbed by the energy absorption means 30 by the time the fluid comes in contact with the outer casing 40 such that slow fluid or fluid with low kinetic energy reaches the outer casing 40.

The realization of the outer casing 40 with sintered metallic material serves for preventing a fluid mist from exiting the interior of the secured pressure line section 10. In fact, the outer casing 40, i.e., the sintered metallic material, absorbs the individual fluid droplets of the mist and continuously transports these fluid droplets out of the secured pressure line section 10 while annihilating the mist character. Consequently, a mist can be created in the interior of the secured pressure line section 10, but this mist is annihilated by the outer casing 40 due to its porous structure. In other words, the outer casing serves for also preventing a contamination damage scenario of a secured pressure line section 10 according to FIG. 2.

An embodiment according to FIG. 2 for a secured pressure line section 10 therefore features a safety device with shell parts as energy absorption means and a porous outer casing, both of which are designed for respectively protecting against one of the two damage scenarios. In this case, only the protection against the mechanical damage scenario is initially important in a first variation of the protective device. Depending on the place of installation, this variation of the protective device can also be combined with an outer casing 40 of the type shown in FIG. 2 in order to also protect against the contamination damage scenario.

Spacers 60 that locally fix the energy absorption means 30, as well as the outer casing 40, are not illustrated in FIG. 2 because they are not visible in this section. In this case, this local fixing is absolute, as well as relative referred to the fixing of the individual elements to one another.

The embodiment according to FIG. 2 features the energy absorption means 30 in the form of an inner shell part 33 and an outer shell part 34. In this context, the indications "inner" and "outer" refer to the arrangement in the radial direction. FIG. 2 furthermore shows that the outer shell part 34 features supporting means 50 that are able to accommodate the outer casing 40. The supporting means 50 serve for radially supporting the outer casing 40 in this case. Due to the fact that the outer casing 40 can be radially or circumferentially supported on the outer shell part 34 in this fashion, it is also possible to use spacers 60 that locally fix only the energy absorption means 30 in this embodiment.

Consequently, the elements for protecting against both damage scenarios are also locally arranged separately of one another. In such an embodiment, the elements for protecting against the individual damage scenarios can be realized separately in the form of modules and freely combined with one another depending on the installation site, the fluid used or ambient parameters. In this context, it should be noted that it could in certain applications naturally also be sensible to merely provide protection against the mechanical damage scenario in the form of a protective device according to the first variation, i.e., energy absorption means 30 in the form of curved shell parts 33 and 34, but no outer casing 40.

FIG. 2 also shows that all elements of the protective device of the secured pressure line section 10 can be placed around one another in such a way that already existing and installed pressure lines 20 can also be retrofitted. In order to carry out such a retrofitting process, the inner shell part 33 can be placed around the pressure line 20 due to the wide open side of the shell part 33. In the second step, the outer shell part 34 is placed around the pressure line 20 with its large open surface from the other side, as well as placed around the inner shell part 33 in the overlapping region. The energy absorption means 30 are realized in this fashion. The shell parts 33 and 34 therefore have a C-shaped cross section. Subsequently, the outer casing 40 that also has a C-shaped cross section is placed over the finished energy absorption means 30 and the pressure line 20 contained therein in such a way that the outer casing 40 is accommodated in the supporting means 50 of the outer shell part 34. The second protection against contamination damage scenarios is realized in this fashion.

Figure 3:
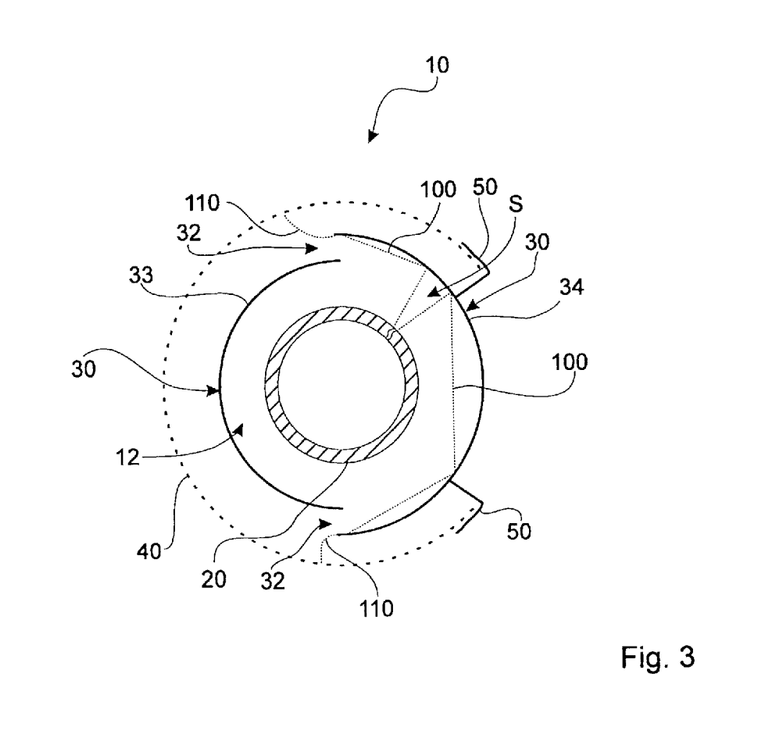
FIG. 3 shows a pressure line with another embodiment of a protective device.

FIG. 3 shows another embodiment of a protective device and a secured pressure line section 10 equipped therewith. The embodiment according to FIG. 3 is very similar to the embodiment shown in FIG. 2, but the energy absorption means 30 realized in the form of two shell parts 33 and 34 consist of shell parts 33 and 34 with constant curvature radii in this case. An outer casing 40 that surrounds the energy absorption means 30 is provided in this embodiment in order to also protect against contamination damage scenarios in addition to the protection against mechanical damage scenarios in the form of the energy absorption means. The instance of a potential leak and the function of the protective device with respect to the mechanical damage scenario, as well as the contamination damage scenario, are briefly described below with reference to FIG. 3.

If a leak develops in the pressure line 20 in the interior of a secured pressure line section 20 as illustrated in FIG. 3, a fluid jet 100 is discharged through the leak. This fluid jet 100 is discharged with high kinetic energy because the interior of the pressure line 20 is subjected to an internal pressure in order to convey the pressurized fluid. After exiting the leakage opening, the fluid jet 100 has a high kinetic energy and therefore poses a risk with respect to mechanical damage scenarios as described in the introduction to this description. Due to the inventive arrangement of the protective device on the leakage opening illustrated in FIG. 3, the fluid jet initially impacts on the outer shell part 34 after it exits the leakage opening. FIG. 3 respectively shows two fluid jets 100 that are defined as jets on the outer side of a dispersion area S, i.e., an exit cone of the pressurized fluid. These two fluid jets impact twice on the outer shell part 34 in one instance (upper path) and three times on the outer shell part 34 in the other instance (lower path). The fluid jet 100 loses kinetic energy with each impact, i.e., each contact of the fluid jet 100 with the energy absorption means 30 such as, e.g., the outer shell part 34 in the arrangement of the leakage opening according to FIG. 3. In other words, the fluid jet 100 is decelerated due to the contact with the energy absorption means 30 and therefore also no longer poses a risk with respect to mechanical damage scenarios.

The fluid can only exit the inner region 12 within the energy absorption means 30 through the openings 32 in the form of a fluid jet 110 with reduced kinetic energy after the kinetic energy of the fluid jet 100 has been reduced, i.e., after decelerating or breaking up the fluid jet. In this case, the openings 32 are also realized in the overlapping region between the shell parts 33 and 34, namely with radial clearances and a corresponding extension along the longitudinal direction. In FIG. 3, the reduced kinetic energy is illustrated in the form of a curved or declining path of the fluid jet 110. Consequently, the fluid jet 110 no longer has the energy to extend along an essentially straight line, but rather follows a curved trajectory, i.e., a trajectory of reduced energy. The mechanical damage scenario is prevented in this fashion by means of the protective device with energy absorption means 30.

The fluid jet 110 with reduced kinetic energy now impacts on the outer casing 40 and is then purposefully transported outward, i.e., out of the secured pressure line section 10, wherein a potential mist formation, in particular, within the secured pressure line section 10 is simultaneously prevented. All other advantages and developments of an embodiment according to FIG. 3 are similar or identical to those described above with reference to FIG. 2. The elements for protecting against mechanical damage scenarios and contamination damage scenarios are also realized independently of one another in this embodiment, but could also be combined.

Figure 4:
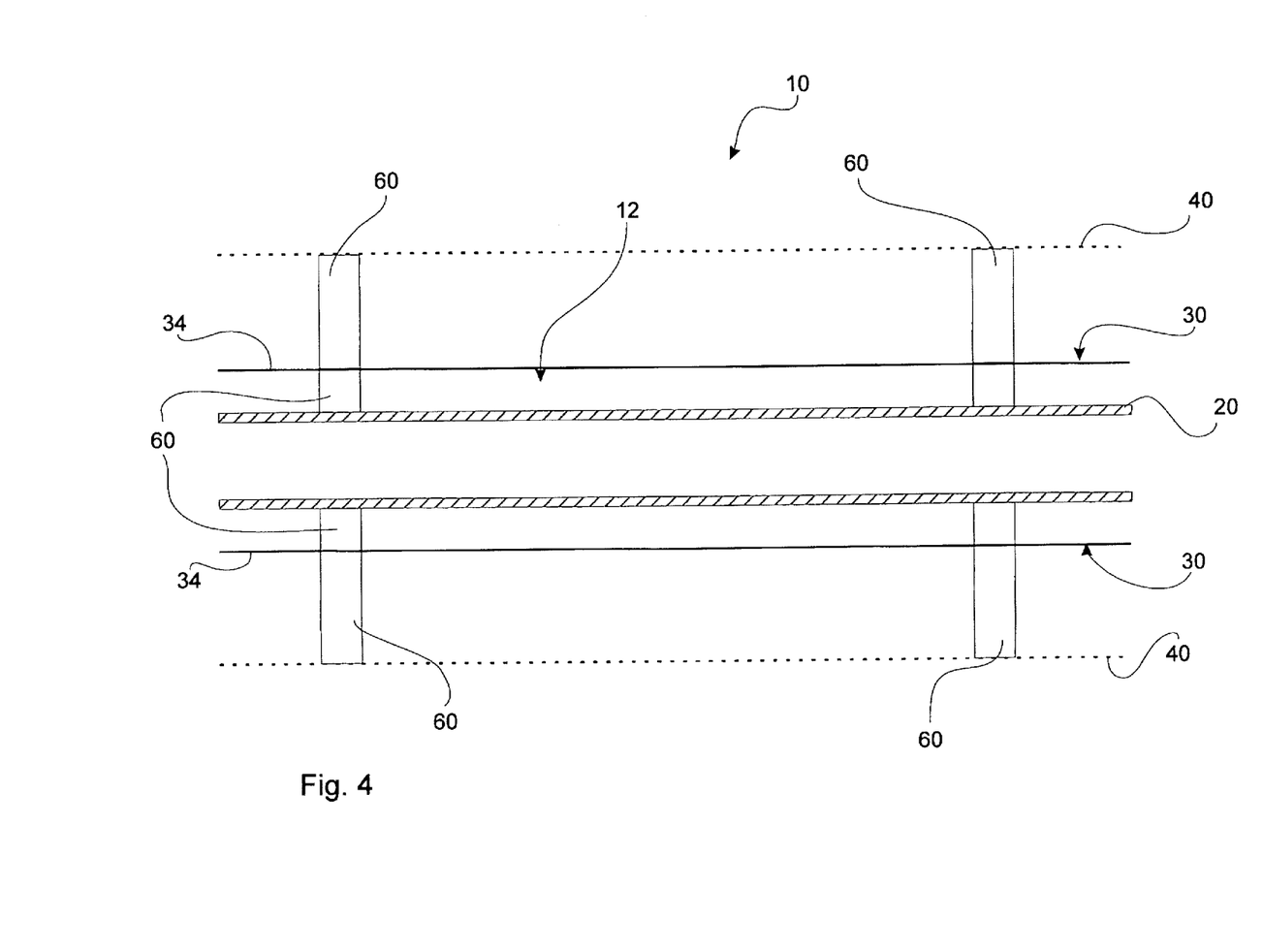
FIG. 4 shows a lateral cross section through the protective device according to FIG. 3.

FIG. 4 shows a cross section along the longitudinal direction of the embodiment according to FIG. 3. However, a cross section in the longitudinal direction of the embodiment according to FIG. 2 is essentially identical to the cross section illustrated in FIG. 4. In this cross section, the arrangement of the spacers 60 is illustrated more clearly and therefore can also be described in greater detail. The spacers 60 essentially extend radially, wherein it should be noted that they are not closed in the circumferential direction. This means that escaping fluid can flow in the longitudinal direction of the secured pressure line section 10 in the inner region 12, as well as in the region between the energy absorption means 30 and the outer casing 40. The spacers 60 are designed for locally fixing the energy absorption means 30, as well as the outer casing 40. The spacers 60 are radially attached to the pressure line 20 and clamp the energy absorption means 30 in position at a defined radial clearance from the pressure line 20. The outer casing 40 is radially spaced apart and therefore locally fixed in the same fashion.

With respect to FIG. 4, it should be noted that only the inner shell part 33 of the energy absorption means 30 is visible in this cross section due to the overlap illustrated in FIGS. 2 and 3.

Figure 5:
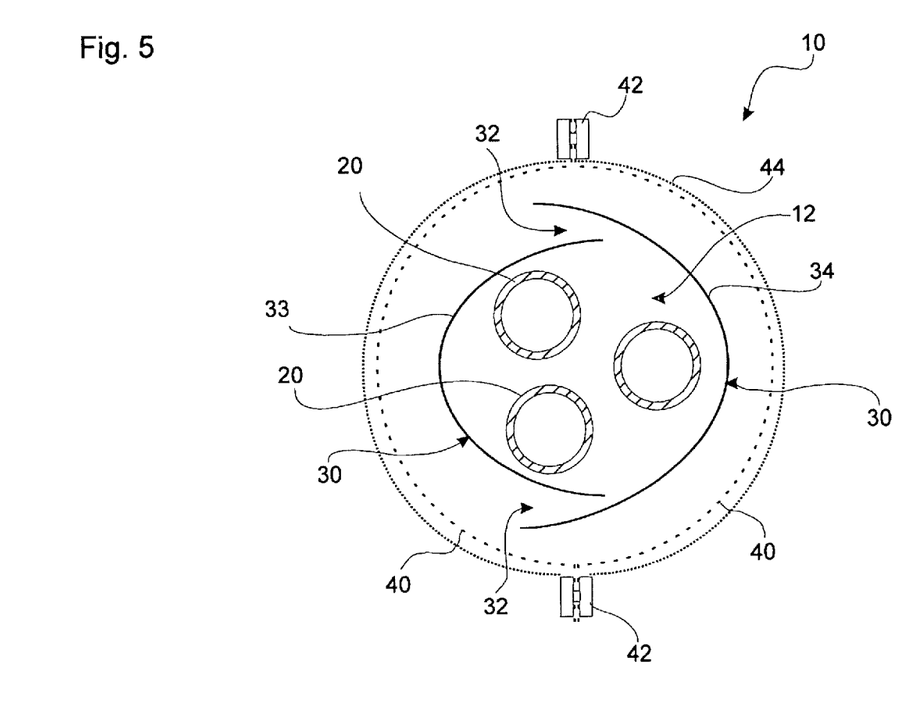
FIG. 5 shows another embodiment of a protective device.

FIG. 5 shows another embodiment of a secured pressure line section 10 with another embodiment of a protective device. In this case, three pressure lines 20 are accommodated in the inner region 12 of the secured pressure line section 10. Due to the different arrangement of the pressure lines 20 in the inner region 12 of the secured pressure line section 10, the overlapping region between the two shell parts 33 and 34 also had to be realized differently, namely with a greater overlap, in order to ensure that no straight fluid jet can exit the inner region 12 of the secured pressure line section 10 with high kinetic energy from any potential leak position. In this case, the kinetic energy of the high-energy fluid jet 100 being discharged is absorbed in the same fashion as described above with reference to FIG. 3.

In contrast to the already described alternative embodiments of secured pressure line sections 10 and protective devices, a two-piece outer casing 40 is provided in the present embodiment. The outer casing therefore is not directly connected to one of the shell parts 33 or 34, but rather externally fixed and locally defined by the spacers 60 that are not illustrated in FIG. 5. In order to ensure that such an embodiment can be retrofitted, the outer casing 40 consists of two pieces and the two half-shell elements are fixed relative to one another with connecting means 42 in the form of screws or rivets. This outer casing 40 may also be realized porous, as well as in a felt-like or screen-like fashion.

This embodiment furthermore features a layer of indicator material 44 on the outside of the outer casing 40, wherein said indicator material changes its color when it comes in contact with the fluid conveyed in the pressure lines 20 due to a chemical reaction. If fluid is discharged from one of the pressure lines 20 in case of a leak or initial leakiness, this fluid will reach the outer casing 40 over time and is then transported outward by the outer casing due to its porosity or screen-like design. A color change takes place in the layer with indicator material 44 due to the chemical reaction such that a leak or initial leakiness in the externally invisible pressure lines 20 can also be detected outside the secured pressure line section 10. In this case, the indicator material 44 may be arranged over the entire outside of the outer casing 40, but individual indicator regions may also be spaced apart in the circumferential direction and/or in the longitudinal direction. In this context, it should also be noted that the arrangement of a layer with indicator material, as well as the multi-piece design of the outer casing 40, naturally can be freely combined with the exemplary embodiments described with reference to FIGS. 2, 3 and 4 without deviating from the scope of the present invention.

Figure 6:
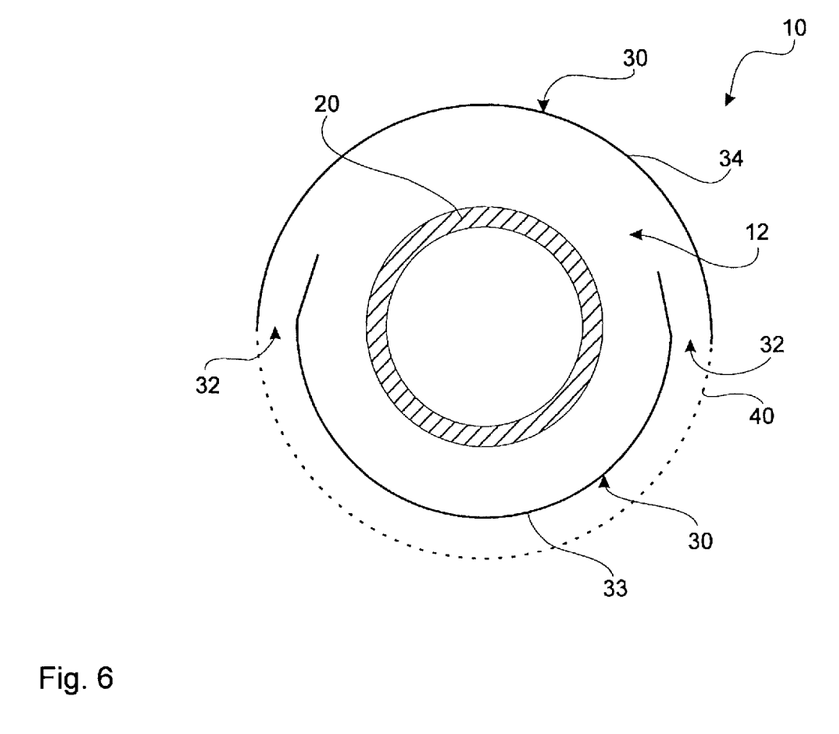
FIG. 6 shows another embodiment of a protective device.

FIG. 6 shows another embodiment of the present invention, in which the outer casing 40 essentially extends in the radial direction similar to the outer shell part 34. This embodiment serves for elucidating the broad geometric variability of an inventive protective device and a pressure line section 10 secured according to the invention. In this embodiment, the outer casing 40 was reduced to a minimum referred to its geometric dimensions, but the inventive separation of the functionalities with respect to the mechanical and the contamination damage scenarios is still preserved. Even with such a maximum reduction of the outer casing 40, it is still ensured that a fluid jet 100 discharged from a potential leak exits the pressure line 20 with high kinetic energy and then initially impacts on one of the two shell parts 33 or 34 in order to diminish its kinetic energy. The thusly decelerated fluid jet 110 exits the inner region 12 of the secured pressure line section 10 through one of the openings 32 that are formed by the radial clearance in the overlapping regions of the shell parts 33 and 34 and reaches the outer casing 40 in this fashion. This outer casing 40 is once again realized in a porous or screen-like fashion and serves for transporting the fluid outward.

Regardless of the respective embodiment, one common aspect of all embodiments is that the openings 32 for discharging the fluid escaping through the leak from the inner region 12, as well as the design of the outer casing 40 with respect to its permeability to the fluid conveyed in the pressure lines, are realized such that they allow the fluid to pass through at a permeation rate that is greater than or equal to the flow rate within the pressure lines 20. When dealing with compressible pressurized fluids such as gases, it naturally needs to be observed in the design stage that the degree of the pressure reduction during the discharge from the pressure line 20 and the associated volume increase of the escaping fluid are taken into account in the permeation rates, i.e., in the permeation speeds. Even if a large quantity of fluid escapes from the pressure line within the energy absorption means 30 and also within the outer casing 40, this prevents the build-up of so-called secondary pressure that could lead to an uncontrollable leak of the energy absorption means 30 and/or the outer casing 40 and therefore to a mechanical and/or contamination damage scenario.

Figure 7:
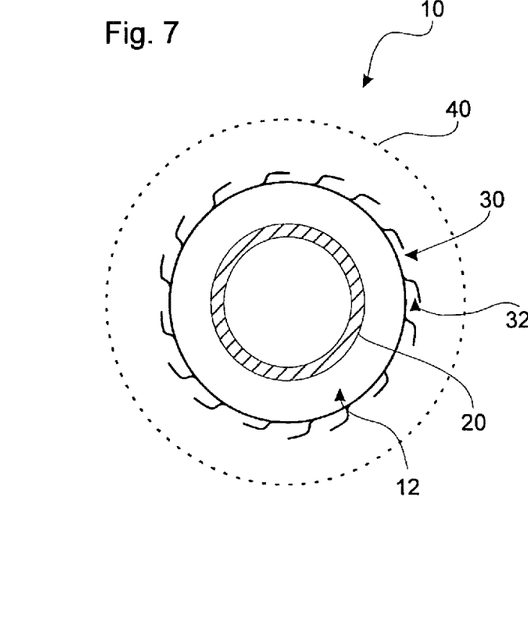
FIG. 7 shows another embodiment of a protective device.
Figure 8:
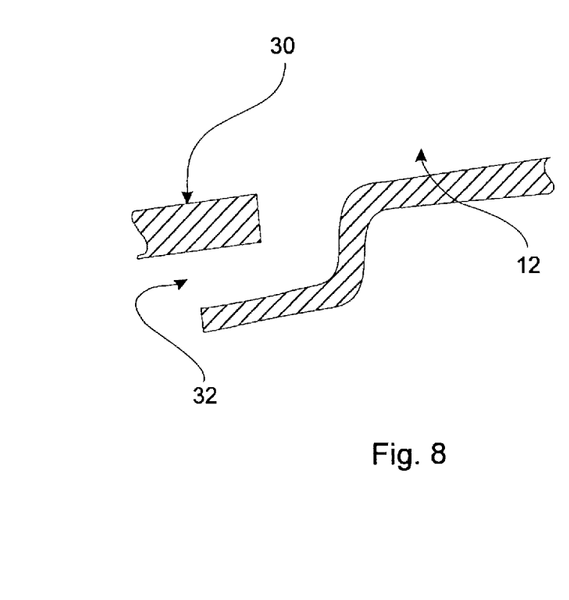
FIG. 8 shows a detail of the protective device according to FIG. 7.

FIGS. 7 and 8 shows another embodiment of the present invention that features a one-piece energy absorption means 30. In this context, it should be noted that the embodiment according to FIG. 7 naturally may be modified in such a way that the energy absorption means 30 features flanges similar to those of the outer casing 40 in the embodiment according to FIG. 5 in order to simplify its installation.

This embodiment is described in greater detail with reference to the cross section in FIG. 7. A pressure line 20 that is surrounded by energy absorption means 30 is once again arranged in the interior. The energy absorption means 30 feature openings 32 that are realized in such a way that a circumferential overlap is produced within the one-piece energy absorption means 30. The openings 32 are once again created by radially spacing apart the respective overlap. This embodiment of the energy absorption means 30 can be compared to openings of kitchen graters that are manufactured by cutting along a line and subsequently recessing the cut material. An outer casing 40 of porous and/or screen-like material is once again provided around the energy absorption means 30 in order to protect against contamination damage scenarios. Since the energy absorption means 30 according to this embodiment only has one essentially constant main radius, a more compact design than in the embodiments with several shell parts 33 and 34 can be achieved in this fashion.

FIG. 8 shows the overlap of the energy absorption means 30 in greater detail. According to this figure, an overlap can be realized within the one-piece energy absorption means 30 by recessing the material such that an opening 32 is created due to the radial spacing of the overlap and only fluid, the kinetic energy of which was reduced by means of the energy absorption means 30, can escape from the inner region 12 through said opening.

The individual elements and characteristics that were described with reference to the various individual embodiments of the protective devices and also the pressure line sections according to the present invention naturally can be arbitrarily combined with one another and assembled into an ideal overall combination depending on the installation site and the application. In this context, it should be noted, in particular, that all embodiments that were described above with reference to the figures generally pertain to pressure lines 20 of the type used, for example, in hydraulic systems. Consequently, all exemplary embodiments and their possible combinations can be used for hydraulic lines and hydraulic fluid conveyed therein in order to protect against mechanical damage scenarios and contamination damage scenarios. Other applications are also conceivable, for example, conveying pressurized compressible fluids such as hot steam. A different significance of the two damage scenarios needs to be established in dependence on the application, the installation site and, in particular, the conveyed pressurized fluid. When using pressure lines that convey hot steam, for example, the protection against mechanical damage scenarios much more important than the protection against contamination damage scenarios. When the secured pressure line sections 10 are used for hydraulic systems and hydraulic oils that usually are highly toxic, the mechanical damage scenario and the contamination damage scenario are equally important and accordingly need to be prevented in an equally reliable fashion.

LIST OF REFERENCE SYMBOLS

10 Secured pressure line section
12 Protected inner region
20 Pressure line
30 Energy absorption means
32 Opening
33 Inner shell part of energy absorption means
34 Outer shell part of energy absorption means
40 Outer casing
42 Connecting means
44 Indicator material
50 Supporting means
60 Spacer
100 Fluid jet
110 Fluid jet with reduced kinetic energy
S Dispersion area

The invention claimed is:

1. A protective device for a pressure line for conveying pressurized fluids that extends in a longitudinal direction, a radial direction, and a circumferential direction referred to the radial direction, wherein the protective device comprises:
an energy absorption device comprising shell parts that extend in the longitudinal direction and curve in the radial direction, wherein the shell parts surround an inner region that is protected by the protective device and in which a pressure line is arranged such that edge regions of the shell parts overlap along the circumferential direction so that a radial clearance is provided between the shell parts at the overlap and the kinetic energy of the fluid being discharged in case of a leak in the pressure line is reduced due to the impact of the fluid on the energy absorption device;
a porous or screen-like outer casing that at least partially surrounds the energy absorption device and is therefore permeable to the fluid in the pressure line; and
spacers that locally fix the energy absorption device and the outer casing;
wherein the entire energy absorption device is arranged between the inner region and the outer casing such that the fluid escaping in case of a leak in the pressure line initially only has an impact on the energy absorption device;
wherein the energy absorption device is provided with at least one opening that is designed such that the fluid comes in contact with the outer casing with reduced kinetic energy and exits the protective device through the outer casing; and
wherein the energy absorption device comprises an inner shell part having an outer surface which extends in the circumferential direction and an outer shell part having an inner surface which extends in the circumferential direction, and wherein at the overlap the inner surface of the outer shell part extends opposite the outer surface of the inner shell part and the radial clearance is present between the inner surface of the outer shell part and the outer surface of the inner shell part so that fluid leaking from the pressure line, after being intercepted by one of the shell parts, may escape from the energy absorption device through the radial clearance between the inner and outer surfaces.

2. The protective device according to claim 1, wherein at least a dispersion area for a fluid being discharged from the pressure line, which is defined by the dimensions of the opening in the energy absorption device and all potential leakage points of a pressure line to be arranged in the protected inner region, is covered by the outer part.

3. The protective device according to claim 1, wherein the individual shell parts of the energy absorption device are shaped such that they at least partially accommodate all components that lie farther radially inward.

4. The protective device according to claim 1, wherein the outer casing is provided with an indicator material that reacts with an indication when it comes in contact with the fluid contained in the pressure line.

5. The protective device according to claim 1, wherein the energy absorption device and the outer casing, are each realized such that already existing pressure lines are retrofitted.

6. A pressure line section for pressurized fluids comprising:
a pressure line for conveying pressurized fluids that extends in a longitudinal direction, a radial direction, and a circumferential direction referred to the radial direction; and
a protective device for the pressure line comprising;
an energy absorption device comprising at least two shell parts that extend in the longitudinal direction and curve in the radial direction, wherein the shell parts surround an inner region that is protected by the protective device and in which a pressure line is arranged such that edge regions of the shell parts overlap along the circumferential direction so that a radial clearance is provided between the shell parts at the overlap and the kinetic energy of the fluid being discharged in case of a leak in the pressure line is reduced due to the impact of the fluid on the energy absorption device,
a porous or screen-like outer casing that at least partially surrounds the energy absorption device and is therefore permeable to the fluid in the pressure line, and
spacers that locally fix the energy absorption device and the outer casing;
wherein the entire energy absorption device is arranged between the inner region and the outer casing such that the fluid escaping in case of a leak in the pressure line initially only has an impact on the energy absorption device;
wherein the energy absorption device is provided with at least one opening that is designed such that the fluid comes in contact with the outer casing with reduced kinetic energy and exits the protective device through the outer casing; and
wherein the energy absorption device comprises an inner shell part having an outer surface which extends in the circumferential direction and an outer shell part having an inner surface which extends in the circumferential direction, and wherein at the overlap the inner surface of the outer shell part extends opposite the outer surface of the inner shell part and the radial clearance is present between the inner surface of the outer shell part and the outer surface of the inner shell part so that fluid leaking from the pressure line, after being intercepted by one of the shell parts, may escape from the energy absorption device through the radial clearance between the inner and outer surfaces.

7. A hydraulic system for an aircraft with a plurality of hydraulic lines, wherein the hydraulic lines of the hydraulic system are at least partially realized in the form of pressure line sections with the characteristics of claim 6.

8. The protective device according to claim 1, wherein the shell parts are secured against moving relative to one another in the circumferential direction.

9. The protective device according to claim 1, wherein the radial clearance between the shell parts at the overlap is greater than or equal to a thickness of one of the two shell parts.

10. The pressure line section according to claim 6, wherein the shell parts are secured against moving relative to one another in the circumferential direction.

11. A method for discharging a pressurized fluid from a leak in a pressure line that extends in a longitudinal direction, a radial direction, and a circumferential direction referred to the radial direction, the method comprising:
  providing a protective device comprising an energy absorption device and a porous or screen-like outer casing that at least partially surrounds the energy absorption device and is therefore permeable to the fluid in the pressure line, wherein the energy absorption device comprises shell parts that extend in the longitudinal direction and curve in the radial direction and at least one opening that is designed such that the fluid comes in contact with the outer casing with reduced kinetic energy and exits the protective device through the outer casing, wherein the shell parts surround an inner region that is protected by the protective device and in which a pressure line is arranged such that edge regions of the shell parts overlap along the circumferential direction so that a radial clearance is provided between the shell parts at the overlap and the kinetic energy of the fluid being discharged in case of a leak in the pressure line is reduced due to the impact of the fluid on the energy absorption device;
  arranging the entire energy absorption device between the inner region and the outer casing such that the pressurized fluid from the leak in the pressure line initially only has an impact on the energy absorption device;
  locally fixing, via spacers, the energy absorption device and the outer casing; intercepting, by an inner shell part having an outer surface which extends in the circumferential direction or an outer shell part having an inner surface which extends in the circumferential direction of the energy absorption device, the pressurized fluid from the leak in the pressure line;
  decelerating, by the inner shell part or the outer shell part, the pressurized fluid in order to reduce the kinetic energy of the pressurized fluid; and
  discharging the decelerated, pressurized fluid from the energy absorption device to the outer casing via the radial clearance between the inner and outer surfaces;
  wherein at the overlap the inner surface of the outer shell part extends opposite the outer surface of the inner shell part and the radial clearance is present between the inner surface of the outer shell part and the outer surface of the inner shell part so that fluid leaking from the pressure line, after being intercepted by one of the shell parts, may escape from the energy absorption device through the radial clearance between the inner and outer surfaces.

* * * * *